United States Patent [19]

Nagashima

[11] Patent Number: 4,793,064
[45] Date of Patent: Dec. 27, 1988

[54] CHAIN SAW SAFETY BRAKING DEVICE

[75] Inventor: Akira Nagashima, Kawasaki, Japan

[73] Assignee: Kioritz Corporation, Tokyo, Japan

[21] Appl. No.: 42,887

[22] Filed: Apr. 27, 1987

[30] Foreign Application Priority Data

May 2, 1986 [JP] Japan .............................. 61-67227[U]

[51] Int. Cl.$^4$ ............................................. B60T 13/04
[52] U.S. Cl. .................................... 30/382; 188/77 R
[58] Field of Search ......................... 30/381, 382, 383; 188/77 R, 166, 96 M; 83/DIG. 1

[56] References Cited

U.S. PATENT DOCUMENTS

| 3,776,331 | 12/1973 | Gustafsson | 30/381 X |
| 3,991,469 | 11/1976 | Frederickson | 30/381 |
| 4,057,900 | 11/1977 | Nagy et al. | 30/382 |
| 4,586,588 | 5/1986 | Nagashima et al. | 188/77 R |
| 4,662,072 | 5/1987 | Wieland et al. | 30/382 |

Primary Examiner—Paul A. Bell
Assistant Examiner—Michael D. Folkerts
Attorney, Agent, or Firm—Browdy and Neimark

[57] ABSTRACT

An arm portion of a pivot member extending in the direction of a brake handle of a chain saw safety braking device is pivoted between a pair of pins of the brake handle. A locking leg portion of the pivot member is engaged with and released from a locking lever in accordance with the pivoting of the brake handle.

2 Claims, 1 Drawing Sheet

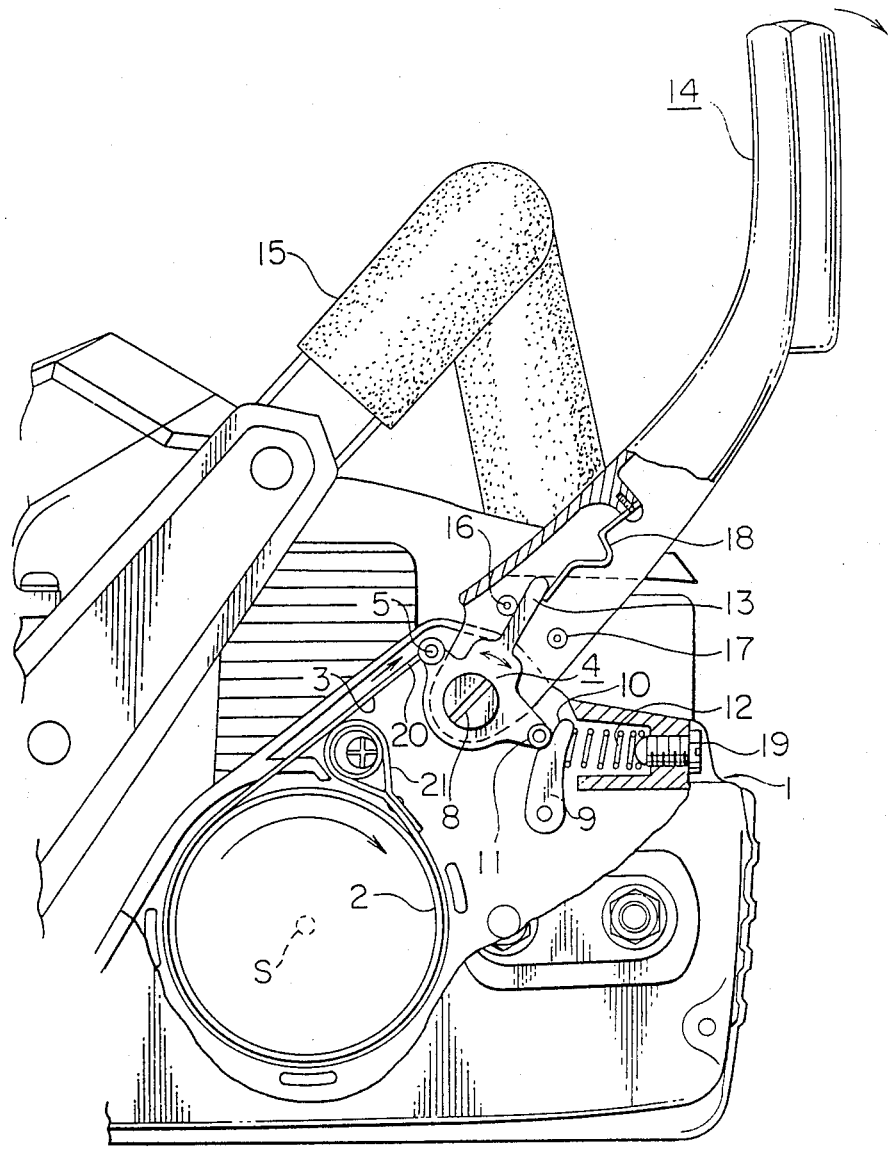

CHAIN SAW SAFETY BRAKING DEVICE

BACKGROUND OF THE INVENTION

1. Field of the Invention

The present invention relates to a safety braking device for use in a chain saw.

2. Description of the Prior Art

Chain saws are adapted to cut trees or the like by utilizing a saw chain running at high speed. However, they involve what is called kick-back phenomenon in which they are caused to bounce back toward an operator during operation by a kick from the saw chain when they are accidentally brought into contact with a knot in the wood being cut. This could cause a very critical accident resulting in injury or death if the saw chain hits the operator while running at high speed. Accordingly, various safety braking devices have been proposed and put into practical use. Such safety braking devices, however, suffer from certain problems in that they tend to have complicated structures and to require a large number of parts, and also in that the repair, inspection and exchange of parts thereof involve complicated procedures.

SUMMARY OF THE INVENTION

An object of the present invention is to provide a chain saw safety braking device which is improved in such a manner that it has a simple structure and is light in weight, is capable of effectively utilizing the weight of a brake handle, and which allows the brake handle having a minimum weight to serve as an acceleration sensor having a high sensitivity.

To this end, according to the present invention, there is provided a chain saw safety braking device which comprises: a brake handle having a lower end pivotally supported on a chain saw body in front of a forward operation handle; and a pivot member supported pivotally and concentrically with respect to the supported portion of the brake handle; the pivot member having a brake operation leg portion on which one end of a brake band wound around the outer periphery of a clutch drum of a centrifugal clutch for driving a saw chain is linked, a locking leg portion which is prevented from pivoting by a locking lever, and an arm portion extending in the direction of the brake handle, wherein the arm portion is pivoted between a pair of pins mounted on the brake handle, and the locking leg portion of the pivot member is engaged with or released from the locking lever in accordance with the pivoting of the brake handle.

Concentrical support of the brake handle and the pivot member ensures quick transmission of rotation. It is necessary for the brake handle just to pivot the pivot member alone. This makes it possible for the brake handle to be lighter weight, as well as having a simplified structure and a more compact size. Further, the pivot member can be turned smoothly, and engagement and release in a locking or braking operation can be thereby facilitated. In other words, the lower end of the brake handle and the pivot member are pivotally and concentrically supported. As a result, the structure thereof can be simplified, and the rotation thereof can be made smooth. The weight of the brake handle can be utilized effectively, making it possible for it to act as an acceleration sensor having high sensitivity. The size and weight of the safety braking device can be thereby reduced, and stable operation thereof is ensured.

BRIEF DESCRIPTION OF THE DRAWING

The sole FIGURE is a cross-sectional view of an essential part of an embodiment of a chain saw safety braking device according to the present invention.

DESCRIPTION OF THE PREFERRED EMBODIMENT

An embodiment of the present invention will be described hereinunder with reference to the accompanying drawing.

A braking device is provided in the vicinity of a clutch drum 2 of a centrifugal clutch device mounted on an engine output shaft S of a chain saw body 1. A saw chain is driven by the clutch drum 2 through a sprocket wheel (not shown) mounted around a boss thereof for driving the saw chain. It is therefore possible to stop the saw chain by braking the clutch drum 2. The braking device employs a brake band 3 which is wound around the outer periphery of the clutch drum 2. One end 20 of the brake band 3 is connected on a brake operation leg portion 5 of a pivot member 4, while the other end 21 thereof is locked on the chain saw body 1 in such a manner that its length is adjustable. The lower end of the pivot member 4 is pivotally supported on the chain saw body 1 by a shaft 8, and is prevented from pivoting by engaging a locking leg portion 11 thereof with a recess 10 formed on a locking lever 9 pivotally supported on the chain saw body 1. A compression coil spring 12 presses the locking lever 9 toward the locking leg portion 11 so as to maintain the locking leg portion 11 and the recess 10 in locked condition. The pivot member 4 is urged by the spring 12 through the locking lever 9 so that it turns in the clockwise direction as viewed in the figure. As a result, when the locking leg portion 11 is removed from the recess 10 of the locking lever 9 and the locking thereof is released, the pivot member 4 quickly turns in the clockwise direction by virtue of the force of the spring 12, pulling the end 20 of the brake band 3 and firmly winding the brake band 3 around the outer periphery of the clutch drum 2 so as to brake the clutch drum 2. In addition, the pivot member 4 has an arm portion 13 extending in the direction of a brake handle 14.

The brake handle 14 is located in front of the forward operation handle 15, and has a lower end pivotally supported on the chain saw body 1 by the shaft 8. The pivot member 4 is also pivotally supported by the same shaft 8 on the body 1, and the arm portion 13 of the pivot member 4 is positioned between a pair of locking pins 16, 17 protruding on the brake handle 14. In consequence, when the brake handle 14 turns in the clockwise direction, the arm portion 13 of the pivot member 4 is pressed against the rear locking pin 16, pivoting the pivot member 4 in the clockwise direction.

As the nose of the saw chain guide bar (not shown) comes into contact with a knot during operation, it receives a kick from the saw chain which is running at high speed, causing the front portion of the body and the guide bar to rebound forcibly and bounce toward the operator while they are still operational. At the time of such a sudden displacement of the chain saw body, the back of the hand of the operator that is holding the handle 15 may collide with the brake handle 14, and the brake handle 14 will be pivoted in the clockwise direction by virtue of the inertia of the brake handle 14 or by the impact force of the hand, pivoting the pivot member 4 in the clockwise direction through the arm portion 13. As a result, the locking leg portion 11 of the pivot member 4 is released from its engagement with the recess 10 of the locking lever 9, releasing the locking condition thereof. At the same time, in addition to the pivot force imparted to the pivot member 4 by the brake handle 14, the pressing force of the spring 12 which urges the locking lever 9 acts on the pivot member 4 and pivots it further at a rapid rate in the clockwise direction. The brake band 3 connected on the brake operation leg portion 5 is thereby pulled to instantaneously provide a braked condition.

After the braking has been effected, a nonbraked condition is reestablished by drawing the brake handle 14 in the counterclockwise direction. The front locking pin 17 of the brake handle 14 thereby pivots the pivot member 4 through the arm portion 13 thereof, pushing it back against the resilient force of the spring 12. This loosens the winding of the brake band 3 onto the clutch drum 2, releasing the clutch drum 2, and the nonbraked condition is thereby reestablished.

A spring 18 provided at the end of the arm portion 13 is adapted to urge the arm portion 13 lightly in the counterclockwise direction so that it constantly abuts lightly against the rear locking pin 16 during the nonbraked condition after the brake handle 14 has been returned in the counterclockwise direction. In this way, separation of the contacted portion due to vibration or generation of noise can be prevented, while the operation of the brake handle is ensured.

A set-screw 19 may be provided to press the external end of the spring 12. This facilitates the assembly and the adjustment.

What is claimed is:

1. A chain saw braking device comprising:
   a brake handle having a lower end pivotally supported by a shaft on a chain saw body in front of a forward operation handle;
   a pivot member supported pivotally by said shaft and concentrically with respect to the supported portion of said brake handle, said pivot member having a brake operation leg portion for connecting one end of a brake band wound onto the outer periphery of a clutch drum of centrifugal clutch for driving a saw chain, a locking leg portion formed at an opposite side of said pivot member with respect to said brake operation leg portion, and an arm portion formed between said brake operation leg portion and said locking leg portion extending in the direction toward said brake handle; and
   a locking lever for preventing said locking leg portion from pivoting in a clockwise direction, wherein said arm portion is pivoted between a pair of pins on said brake handle, said locking leg portion of said pivot member is engaged with and released from said locking lever in accordance with the pivoting of said brake handle, and said brake handle comprises a spring adapted to urge said arm portion in a counterclockwise direction such that said arm portion abuts against one of said pair of pins during a non-braked condition.

2. A chain saw safety braking device according to claim 1, wherein said locking lever being biased by a spring the pressing force of which is adjustable by a set-screw.